Dec. 24, 1935. C. STANSBURY 2,025,315
MOTOR CONTROLLER
Original Filed April 6, 1933 2 Sheets-Sheet 2

Inventor
Carroll Stansbury
By Frank W. Bullard
Attorney

Patented Dec. 24, 1935

2,025,315

UNITED STATES PATENT OFFICE 2,025,315

MOTOR CONTROLLER

Carroll Stansbury, Wauwatosa, Wis., assignor to Cutler-Hammer, Inc., Milwaukee, Wis., a corporation of Delaware Application April 6, 1933, Serial No. 664,695
Renewed January 17, 1935

2 Claims. (Cl. 171—242)

This invention relates to speed regulators for electric motors.

It is particularly applicable to paper machine and similar drives where several sections of the driven machine are provided with individual driving motors and a constant but adjustable speed ratio must be maintained between the various sections. In such cases it is not sufficient merely to maintain a constant average speed ratio but the speed ratio must be the same at any instant, that is, if, for any reason, the speed of one section of the machine varies, the speed of other sections must simultaneously and instantaneously vary in the same ratio.

A well known system heretofore proposed for accomplishing such regulation employs a special form of rheostat in circuit with the field of a direct current motor connected to one section of the machine, and constituting a so-called "following" motor to be so regulated that its speed is kept in a definite relation to the speed of a so-called "leading" motor driving another section of the machine. The rheostat comprises a rotating resistor element coupled to one of the motors and a rotating contact or brush element driven by the other motor and engaging said resistor and being capable of varying its ohmic value. So long as the two elements rotate at exactly the same speed, that is, so long as the speed ratio of the two motors remains the same, the brush stands still relative to the resistor and the ohmic value of the latter in series with the field winding remains constant; but, if one element is driven at a speed differing from that of the other element due to a change in the speed ratio of the two motors, a relative movement takes place between the two elements which results in an adjustment of the value of resistance in series with the field of the "following" motor in such a direction as to tend to correct the speed thereof.

The above-described arrangement has a disadvantage which becomes apparent during the starting up of the "following" motor, while the "leading" motor is already running at the proper speed. Under this condition, the brush rotates at a very high speed and thus continuously varies the regulating resistance between its minimum and maximum value thereby causing pulsations in the field strength of the "following" motor, which is being brought up to speed. As it is not permissible to weaken the field of the motor during the accelerating period, it is necessary that the speed regulating device be rendered inoperative during the accelerating period and be connected in circuit only after the "following" motor has reached approximately the correct speed ratio with respect to the "leading" motor.

The proposal discussed is not practical because the relatively large motors required by paper machines necessitate employment of large rheostats and hence it has been proposed to make the resistor stationary and to drive the brush through a differential gearing connected between the "leading" and "following" motor in such a manner that the brush stands still when the speed ratio of the motor shafts has a desired value. If, however, the speed ratio of the two shafts should depart from the desired value due to a speed change of either motor, the brush is moved to thereby adjust the value of the resistor in series with the field of the following motor so as to reestablish again the desired speed ratio.

In another type of regulator with a differential drive the brush is connected to a travelling nut, the nut being rotated by one of the motor shafts while an engaging screw is rotated in the same direction by the other shaft. As long as the nut and screw rotate at the same speed the nut does not move laterally and therefore the brush stands still and the field resistance remains constant. If, however, there is a speed difference between the nut and the screw the latter is shifted axially in one direction or the other thereby shifting the contact brush and varying the value of the field resistance in the manner aforedescribed. By terminating the threads on the screw at the two extremes of the brush travel so that the screw turns freely without engaging the threads of the nut, it is possible to permit acceleration of the "following" motor with constant full field strength as, in this case, the nut and the brush are moved to and held at their extreme full field position.

An object of the present invention is to provide a regulator for the aforementioned purpose which is free from the complications inherent in a mechanical differential drive for the field rheostat.

Another object is to provide a regulator whose action is positive and continuous and which regulates the field strength in an even and continuous manner.

Another object is to provide a regulator which permits starting of the "following" motor in a simple manner and without any additional apparatus or manipulations.

The accompanying drawings illustrate one embodiment of the invention together with certain modifications thereof, which will now be described, it being understood that the embodiment illustrated is susceptible of other modifications without departing from the spirit and scope of the appended claims.

In the drawings

Figure 1:
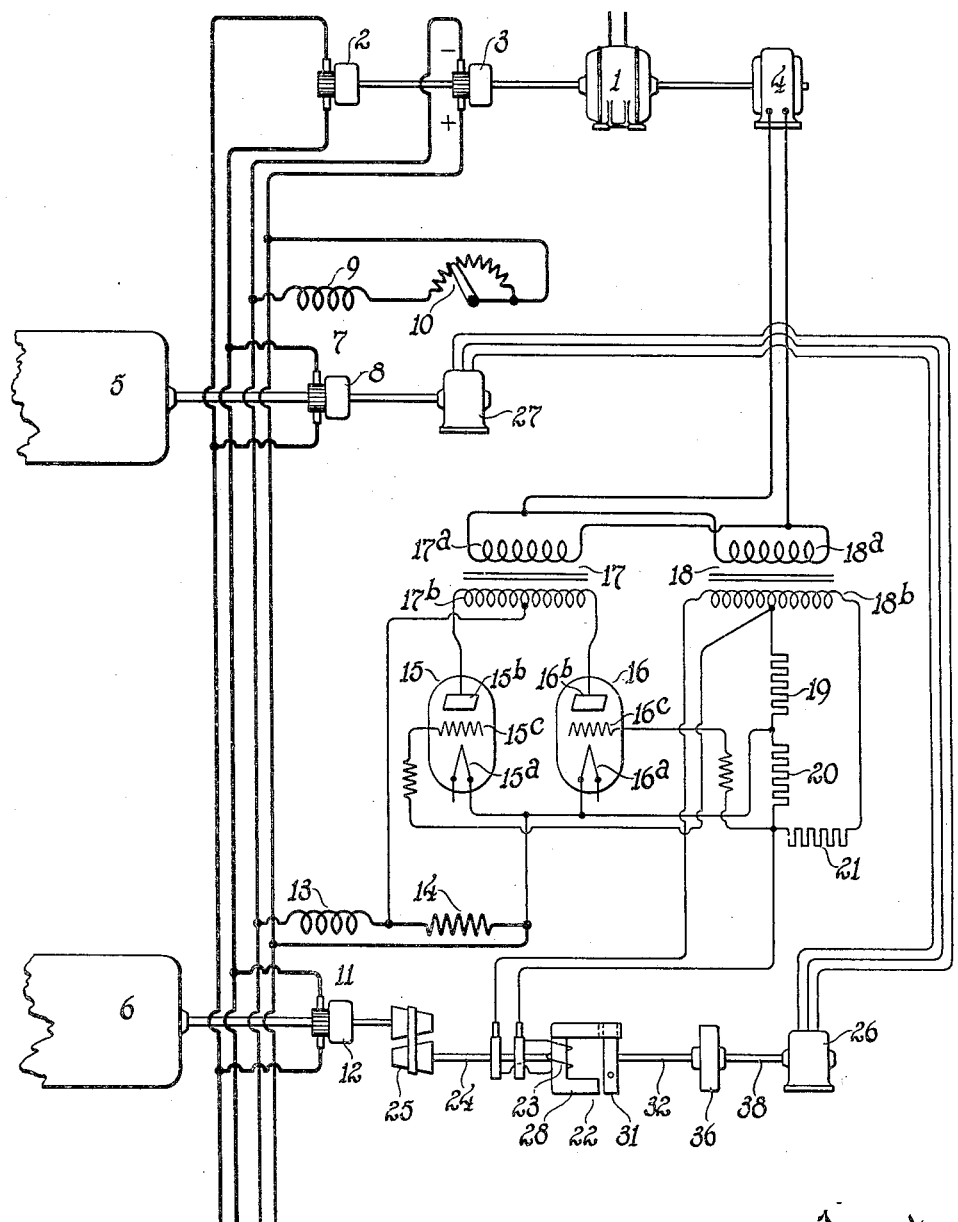
Figure 1 is a diagram of a paper machine drive embodying the invention.

The system illustrated in Fig. 1 comprises an electric motor or other prime mover 1, to which is coupled the armature of a main direct current generator 2, an auxiliary direct current generator 3 and an alternating current control generator 4. A paper machine having independent sections 5 and 6 is arranged to have section 5 driven by a "leading" motor 7 having an armature 8 and a field winding 9. The armature 8 is connected across the generator 2, while the field winding 9 is connected in series with a field regulating rheostat 10 across the generator 3. It will be understood, however, that leading section 5 of the paper machine may be driven by any other type of prime mover supplied with power and having its speed regulated in any desired way. It is also possible to have the "leading" motor operate independently of a paper machine section, i. e. to have it function solely as a speed standard of reference for the "following" motors.

The paper machine also has a number of "following" sections of which only one, 6, is illustrated in the drawings, it being understood that any additional sections would be equipped with driving means and regulators similar to those illustrated and presently to be described. The section 6 is driven by a "following" motor 11 having an armature 12 connected to the generator 2 and a field winding 13 which is connected in series with a field regulating resistor 14 across the generator 3. The current through the field winding 13 is controlled by controlling the voltage drop through the resistance 14 in a manner to be described.

The instrumentalities for accomplishing this control consist of two gaseous electron discharge tubes 15 and 16 having, respectively, cathodes 15$^a$ and 16$^a$, anodes 15$^b$ and 16$^b$ and control grids 15$^c$ and 16$^c$. The tubes are supplied with an alternating current from a transformer 17, the primary winding 17$^a$ of which is connected to the alternating current generator 4 while a secondary winding 17$^b$ forms a connection between the anodes 15$^b$ and 16$^b$. The center point of the secondary winding 17$^b$ is connected to a common terminal of the field winding 13 and the resistance 14. The field controller for the motor 11 further includes a transformer 18 having a primary winding 18$^a$, which is connected to the generator 4, and a secondary winding 18$^b$. The latter is divided in two equal parts. One end of a non-inductive resistance 19 and the grid 15$^c$ are connected to the center tap of the winding 18$^b$. A second non-inductive resistance 20 is connected in series with the resistance 19. The common terminal of the resistances 19 and 20 is connected to the cathodes 15$^a$ and 16$^a$, said cathodes being also connected to the positive terminal of generator 3. A non-inductive resistance 21 has one of its terminals connected in series with resistance 20 while the other terminal is connected to one outer terminal of the winding 18$^b$. The junction point of resistances 20 and 21 is connected to the grid 16$^c$ and also to the other outer terminal of the winding 18$^b$ through the coil 23 of a rotatable inductance device 22.

One part of the rotatable inductance device 22 carrying the winding 23 is connected through a shaft 24 and variable speed pulleys 25 to the shaft of the motor 11. The other part 31 of the inductance device 22 is driven by any well known rotating synchronous electrical transmission "receiver" 26 which is supplied with power from a similar device 27 operating as a "sender", driven by the "leading" motor 7, in such a manner that the "receiver" 26 rotates always in exact synchronism with the "sender" 27.

Figure 2:
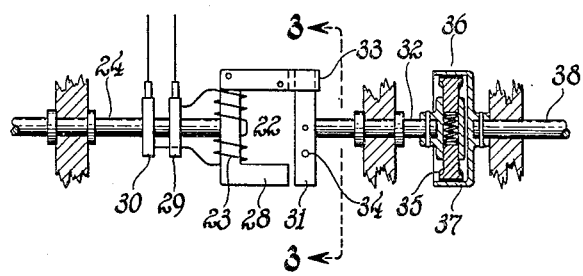
Fig. 2 is a detailed view of that element of the system shown in Fig. 1 which responds to changes in relative speeds of the two shafts whose speed is to be compared.

The rotatable inductance device 22 is illustrated more in detail in Fig. 2. It consists of a U-shaped laminated frame 28 which carries the inductance coil 23 and which is mounted on the shaft 24 so as to rotate with the latter. The terminals of the coil 23 are connected to slip rings 29 and 30 respectively, which are mounted on the shaft 24 and which engage corresponding stationary brushes through which the inductance coil 23 is connected in circuit as aforedescribed. An armature 31 is mounted adjacent to the U-shaped frame 28 on a shaft 32 which is in line with shaft 24, said armature being thus rotatable relative to the frame 28. The latter is provided with a non-magnetic stop 33 which limits the counter-clockwise movement of the armature 31 relative to the frame 28 while a stop 34 attached to the armature 31 engages the stop 33 when the armature moves in a clockwise direction relative to the frame 28 through an angle of 90° from the position shown in Figs. 2 and 3. If the armature and the frame are in the relative positions shown in Figs. 2 and 3, the reluctance of the magnetic circuit for coil 23 is a minimum and therefore the inductance of said coil is a maximum, whereas if the armature 31 is rotated in a clockwise direction through an angle of 90° relative to the frame 28, the inductance of the coil 23 is a minimum. The shaft 32 carrying the armature 31 also carries one element 35 of a slip clutch 36, the other element 37 of which is mounted on the shaft 38. This slip clutch may be of any well known design and is arranged in such a manner that it rotates the shaft 32 without relative slippage when the shaft 38 is rotated by the driving element 26 but slips when the armature 31 engages either stop 33 or stop 34.

Figure 4:
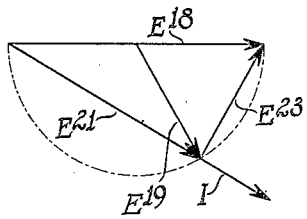
Fig. 4 is a vector diagram of certain voltages, the relation of which varies with the relative position and speed of the two shafts.

The operation of the circuit including the inductance coil 23, transformer winding 18$^b$ and resistances 19, 20 and 21 will now be described with reference to Figs. 1 and 4. The transformers 17 and 18 are connected across a common source of alternating current. Therefore the voltages impressed upon their primary windings 17$^a$ and 18$^a$ respectively are in phase, as are also the voltages induced in the secondary windings 17$^b$ and 18$^b$ respectively. The gaseous electron tubes 15 and 16, together with the transformer winding 17$^b$, form a full wave rectifier in which, during one half cycle, the potential of the anode 15b is positive with respect to the cathode 15a, while that of the anode 16b is negative with respect to that of the cathode 16a, and during the succeeding half cycle said polarities are reversed. Therefore, if the tubes 15 and 16 are rendered conducting, a current flows through the resistance 14 to one or the other half of the winding 17b through the tube 15 or 16 back to the resistance 14. This current causes a potential difference on the terminals of the resistance 14 and if the circuit of the field winding 13 is connected across the direct current source 3, this potential difference is added to or subtracted from the voltage impressed upon the field by said source and causes a change of the field strength as will be further explained hereinafter.

The voltage induced in the transformer winding 18b is substantially in phase with that induced in the winding 17b. The voltage induced in the winding 18b is represented by the vector $E^{18}$ in the diagram, Fig. 4. This voltage causes a current flow from the right hand end terminal of the winding 18b through the resistance 21, the coil 23 of reactance 22, back to the left hand terminal of the winding 18b, which current is represented by the vector I, provided that the ohmic values of the resistors 19 and 20 are high relative to the value of the resistor 21, so that the current flow from the center tap of the winding 18b over the resistors 19 and 20 may be neglected. The voltage $E^{18}$ impressed upon the circuit aforedescribed may be divided into a non-inductive component $E^{21}$ which is in phase with the current I and an inductive component $E^{23}$ which is 90° out of phase with the former and which is due to the inductive drop in the coil 23. Hence the voltage from the center tap of winding 18b to the common terminal of resistor 21 and reactance 23 is vectorially represented by $E^{19}$, that is, the vector from the center of $E^{18}$ to the end of the vector $E^{21}$.

If the value of the reactance 22 is varied by relative motion between the frame 28 and the armature 31, the relation between the voltages $E^{21}$ and $E^{23}$ varies so that the direction of the vector $E^{19}$ relative to the vector $E^{18}$ varies, the locus of the vectors $E^{21}$ and $E^{23}$ being a semi-circle over $E^{18}$, as is well known.

Let it be assumed that at the beginning of a given half cycle the potential of the right hand terminal of winding 18b is highly negative with respect to the center tap, and the potential of the center tap is positive with respect to the common terminal of the resistances 19 and 20. If the anode 16b is positive during the same half cycle with respect to the cathode 16a, the grid 16c will be negative with respect to the cathode 16a, and no current will flow through the tube 16. If, however, there is a phase displacement between the cathode voltage and the grid voltage, as indicated in Fig. 4, the grid 16c will become positive relative to the cathode 16a at a given moment during the half cycle and the tube 16 will conduct current during the rest of such half cycle. During the next half cycle, tube 16 will be non-conducting as aforedescribed, but tube 15 will become conducting when the grid 15c becomes positive. The moment when the respective grid becomes positive during the positive half cycle of the corresponding tube can be varied by varying the value of the inductance 22 as aforedescribed and thus the effective current which passes through the resistance 14 and the voltage drop therethrough can be varied, as will be explained hereinafter.

Figure 5:
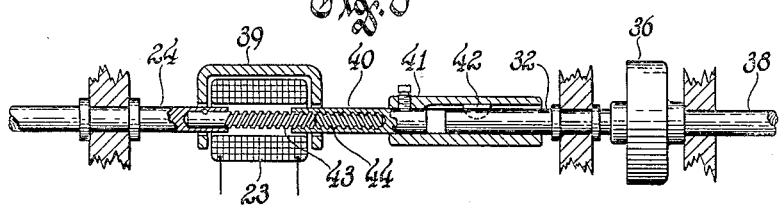
Fig. 5 is a modification of the details illustrated in Fig. 2.

Fig. 5 shows another method of changing the inductance of the coil 23. In this case, the coil 23 is stationary and is equipped with a stationary U-shaped field structure 39 which is adjacent to a shaft 24 and a shaft 40, the latter being driven in turn by the shaft 32 through a coupling 41 which is in sliding engagement with the shaft 32 and may move longitudinally, being held in angular position relative to shaft 32 by means of a key 42 and a corresponding key-way. Fastened to the end of shaft 24 is a non-magnetic screw 43 which engages a threaded hole 44 in the end of shaft 40. If there is an angular motion between the shaft 24 and the shaft 40 the latter is moved longitudinally, narrowing or widening the air gap between the adjacent ends of shafts 24 and 40, and as both mentioned shafts are of magnetic material and the frame 39 is mounted adjacent thereto, the reluctance of the magnetic circuit, which is interlinked with the coil 23, varies in accordance with the longitudinal distance between the shafts 24 and 40. Hence relative angular motion between these two shafts produces variations in the inductance of the coil 23 in a manner similar to that aforedescribed in connection with Fig. 2. The advantage of the system shown in Fig. 5 is that both the magnetic frame and the coil are stationary so that no slip rings are required for the connection of the coil.

Figure 3:
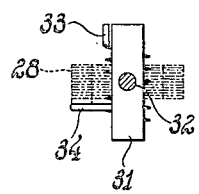
Fig. 3 is a cross section of Fig. 2 along the line 3—3.
Figure 6:
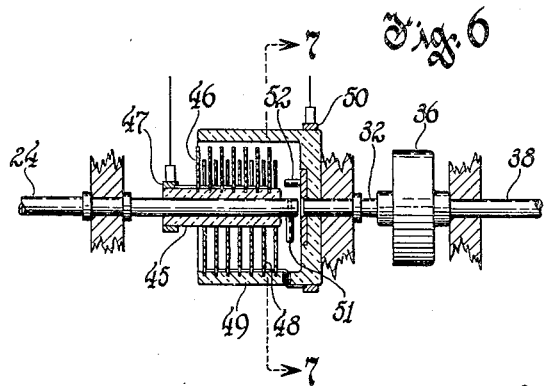
Fig. 6 illustrates still another form of the apparatus illustrated in Fig. 2.
Figure 7:
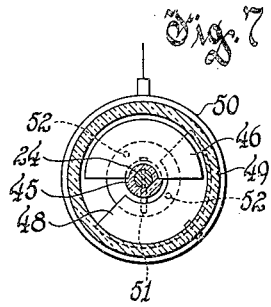
Fig. 7 is a cross section of Fig. 6 along the line 7—7.

Instead of employing a variable inductance 23 and a resistance 21 to produce the phase shift of the voltage $E^{19}$ in Fig. 3, it is possible to substitute a condenser for the resistor 21 and a resistor for the inductance coil 23. Such a condenser is shown in Fig. 6. Shaft 24 carries an insulating bushing 45 on which is mounted one set of plates 46 of the condenser, these plates being connected with a slip-ring 47. A second set of plates 48 is mounted in the support 49 which is attached to the shaft 32. The second set of condenser plates 48 is connected to the slip ring 50. The condenser plates are so shaped as to produce the desired relation between angular displacement and capacity. Suitable stops 51, 52 limit the maximum relative angular rotation of the plates, as is better illustrated in Fig. 7. The condenser may be connected in circuit by means of the slip ring 47, 50 and engaging brushes. The shaft 32 is connected through a slip clutch 36 to the shaft 38 in the manner aforedescribed in connection with Fig. 2, proportioning of the slip clutch being the same as described already in connection with Fig. 2. The capacity of the condenser remains constant as long as the two shafts 24 and 32 rotate at the same speed and maintain fixed angular position. However, if one of the shafts should rotate faster than the other a change will take place in the capacity of the condenser which will produce a regulating effect as aforedescribed.

The operation of the system illustrated in Fig. 1 will now be described. The paper machine may be put into operation as follows: The motor 7 has its armature 8 connected to the generator 2 and its field rheostat 10 is adjusted for the desired speed. The motor then rotates at the desired speed and drives the section 5 and also the synchronous transmitter 27. This causes the synchronous follower 26 to rotate at a corresponding speed thereby rotating the armature 31 of inductance device 22 to the position of maximum inductance. If the field winding 13 of motor 11 is now connected to the exciter generator 3, a current which is limited by the resistor 14 now flows in this field winding and if the armature 12 is connected to the generator, motor 11 accelerates and drives the section 6 at a low speed. If now the transformers 17 and 18 are also energized, a supplemental voltage is impressed upon the resistance 14 which, since the inductance 22 is a maximum, is also maximum and is added to the voltage drop in the resistance 14. This reduces the current in the field winding 13 and causes additional speeding up of motor 11 until a speed is reached at which the shaft 24 rotates at the same speed as shaft 32. As soon as the speed of shaft 24 tends to exceed the speed of shaft 32, a relative motion takes place between the magnet frame 28 and the armature 31 thereby varying the impedance of the coil 23 and thus varying in the well known manner the voltage drop through the resistance 14 and the strength of the current in the winding 13.

If it is desired to vary the speed of the motor 11 relative to that of the motor 7, the variable speed device 25 is adjusted.

If it is desired to vary the speed of all the motors simultaneously and at proportional rates, the voltage of the generator 2 may be varied. It is also possible to vary the speed of the motor 7 by varying its field excitation whereupon the "following" motors will all automatically have their speed varied through the action of the automatic speed regulating means aforedescribed.

Furthermore, if on slowing down or stopping of the machine as a whole, the "leading" motor 7 slows down more rapidly than the "following" motor 11, the reactance device 22 which controls motor 11 automatically moves to full field position, thus providing dynamic braking action with full field excitation on the following motor. After stopping, the reactance device 22 is left in the position corresponding to the full field excitation of the "following" motor, and thus puts the latter in condition for the next start. While a slip clutch is shown to limit the relative movement of the reactance members, it is, of course, obvious that any other means may be used to accomplish this result.

Thus it will be apparent that the reactance device 22 not only tends to hold the shafts 24 and 32 in step, but if at any time the corrective effect is insufficient to keep the two shafts in step, the reactance device automatically resumes the position of maximum corrective action in the proper direction. The "leading" motor 7 may drive a section of the paper machine or it may be a separate motor, whose sole function is to drive the synchronous transmitter 27 and thus set the pace for the other motors which drive the various sections of the paper machine.

It is to be understood that the invention is not limited to the use of shunt or separately excited motors as illustrated in Figure 1, but that it is equally applicable to any other type of motor and it may be adapted to the control of different motor circuits which are capable of affecting the speed of the motor by having their current controlled in a suitable manner.

It is also to be understood that the invention is not limited to the use of gaseous tubes as described, and it is further possible to omit entirely the electronic tubes and to have the impedance device control directly to the winding of the motor. This is of particular advantage in connection with alternating current, whereby the impedance device may be readily adapted to affect the excitation of the motor.

What I claim as new and desire to secure by Letters Patent is:

1. In a variable reactance device, in combination, with two relatively rotating shafts, of a stationary field member, including a coil, an armature member connected to each shaft, and means to cause lateral movement of said armature members relative to each other in response to relative rotation of said shafts, to thereby vary the reluctance of said reactance device.

2. In a variable reactance device, in combination, with two relatively rotating shafts, of a stationary field member, including a coil, an armature member connected to each shaft, means to cause lateral movement of said armature members relative to each other in response to relative rotation of said shafts to thereby vary the reluctance of said reactance device and a slip clutch to limit said lateral movement.

CARROLL STANSBURY.